United States Patent [19]

Sawada et al.

[11] Patent Number: 5,021,189
[45] Date of Patent: Jun. 4, 1991

[54] LIQUID CRYSTAL COMPOSITION

[75] Inventors: Shinichi Sawada, Ichihara; Tetsuya Matsushita, Chiba; Toyoshiro Isoyama; Hideo Saito, both of Ichihara, all of Japan

[73] Assignee: Chisso Corporation, Japan

[21] Appl. No.: 507,083

[22] Filed: Apr. 5, 1990

Related U.S. Application Data

[63] Continuation of Ser. No. 269,161, Nov. 9, 1988, abandoned.

[30] Foreign Application Priority Data

Nov. 11, 1987 [JP] Japan ................................ 62-283115

[51] Int. Cl.$^5$ ............................................ C09K 19/34
[52] U.S. Cl. ............................. 252/299.61; 252/299.01; 252/299.63; 252/299.67; 252/299.66; 350/350 R
[58] Field of Search .................... 350/350 R, 350 S; 252/299.01, 299.5, 299.6, 299.61, 299.63, 299.67, 299.66

[56] References Cited

U.S. PATENT DOCUMENTS

| | | | |
|---|---|---|---|
| 4,565,425 | 1/1986 | Petrzilka et al. | 350/350 R |
| 4,621,901 | 11/1986 | Petrzilka et al. | 350/350 R |
| 4,670,182 | 6/1987 | Fujita et al. | 252/299.61 |
| 4,676,604 | 6/1987 | Petrzilka | 350/350 R |
| 4,770,503 | 9/1988 | Buchecker et al. | 350/350 R |
| 4,776,975 | 10/1988 | Sawada et al. | 252/299.61 |
| 4,778,620 | 10/1988 | Goto et al. | 252/299.63 |
| 4,815,825 | 5/1989 | Nakagomi et al. | 252/299.5 |
| 4,820,878 | 4/1989 | Takatsu et al. | 252/299.63 |
| 4,846,999 | 7/1989 | Kizaki | 252/299.63 |

FOREIGN PATENT DOCUMENTS

WO88/02130 3/1988 PCT Int'l Appl. .
WO88/07514 10/1988 PCT Int'l Appl. .

OTHER PUBLICATIONS

Baur, "Optical Characteristics of Liquid Crystal Displays" in the Physics and Chemistry of Liquid Crystal Devices, edited by G. J. Sprokel, Plenum Publishing Corporation, pp. 61–78 (1980).

Akatsuka et al., "Electro-Optical Properties of Supertwisted Nematic Display '86", pp. 400–403 (1986).

Leenhouts et al., "Electro-Optics of Supertwist Displays; Dependence on Liquid Crystal Material Parameters", Japan Display '86, pp. 388–391 (1986).

Primary Examiner—John S. Maples
Assistant Examiner—Richard Treanor
Attorney, Agent, or Firm—Leydig, Voit & Mayer

[57] ABSTRACT

The present invention provides a liquid crystal composition wherein properties required in the super twist birefringence effect mode (SBE mode), particularly the high transparent point, low viscosity, and controllable optical isotropic value (Δn) are kept well balanced, the steepness of the voltage-transmission property is improved, and the value of $N_{max}$ that indicates high multiplex properties is high.

A liquid crystal composition is provided containing a first component represented by the general formula:

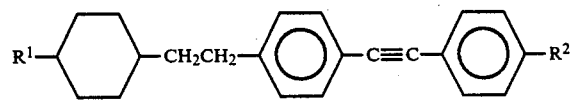

wherein $R^1$ and $R^2$ each represent an alkyl group having 1 to 8 carbon atoms, and a second component represented by the general formula:

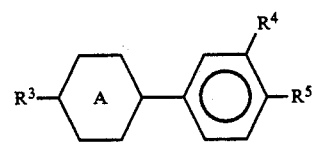

wherein $R^3$ represents an alkyl group having 1 to 8 carbon atoms, or an alkenyl group having 2 to 8 carbon atoms, $R^4$ represents H or F, $R^5$ represents a CN-group or F, and

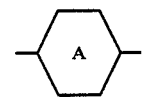

represents

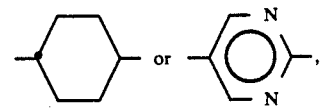

and a liquid crystal display device that uses the same.

8 Claims, No Drawings

LIQUID CRYSTAL COMPOSITION

This application is a continuation of application Ser. No. 269,161 filed Nov. 9, 1988 now abandoned.

BACKGROUND OF THE INVENTION

1. Field of the Invention

The present invention relates to a liquid crystal composition for liquid crystal display.

More particularly the present invention relates to a liquid crystal composition used for high multiplex display devices, and a liquid crystal display device that uses the same.

2. Prior Art

With the recent rapid development of information apparatuses, particularly portable terminal apparatuses, the demand for small-sized, thin and low-power comsumption display devices whose display capacity and display quality correspond to those of the conventional CRT is increasing. Liquid crystal devices meet the demand for small-sized, thin and low-power consumption display devices and have been used customarily in watches and desk-top calculators and as display terminal apparatuses whose duty is on the order of up to 1/100 by the multiplex drive of the TN-type liquid crystal cell whose twist angle is 90 degrees, and in principle it is regarded as difficult to increase the duty number because it lowers the display quality.

On the other hand, the super twist birefringence effect mode (hereinafter abbreviated to SBE mode) is suggested that uses the birefringence effect of a liquid crystal cell whose twist angle is set between 180 and 270 degrees, which is the limit where the bistability of the electrooptical properties of chiral nematic liquid crystals occurs It is reported by T. J. Scheffer et al. {T. J. Scheffer, and J. Nehring: Appl. Phys. Lett. 45, 1021 (1984)} that this SBE mode allows the same driving method as in matrix display of the common 90-degree twist TN mode driven by the fast scan addressing mode that responds to the effective value of the applied voltage, and the SBE mode has far better contrast and wider visual angle than those of 90-degree twist TN display.

Properties required for liquid crystal compositions used in display devices of the SBE mode are the following:
(1) the voltage-transmission property is steep;
(2) the transition temperature of the nematic-isotropic phase (hereinafter abbreviated to the transparent point (clearing point));
(3) a suitable optical anisotropy value (hereinafter abbreviated to Δn) can be taken in accordance with the cell thickness (hereinafter abbreviated to d);
(4) the viscosity is low.

The property under (2) is required in the SBE mode to suppress the occurrence of hue changing of the display accompanied with the temperature dependency of the Δn, thus it is desired that the transparent point is as high as possible.

The property under (4) is particularly effective to shorten the response time in the liquid crystal cell of the SBE mode.

The assignee of the present application filed, as a prior application, Japanese Patent Application Laid-Open No. 152334/1988 (U.S. Ser. No. 07/079,997 now U.S. Pat. No. 4,778,620; EPO Application No. 87 111048.2), which is not prior art against the convention date of the present application.

The prior application discloses a tolan derivative represented by the formula:

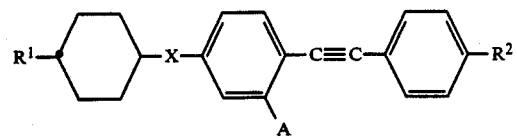

wherein $R^1$ is an alkyl group or an alkyloxy group having 1 to 10 carbon atoms, $R^2$ is an alkyl group of 1 to 10 carbon atoms, X represents —CH$_2$CH$_2$— or a single bond, and A represents H or F, provided that when X is a single bond, A is F.

SUMMARY OF THE INVENTION

An object of the present invention is to provide a nematic liquid crystal composition having an improved steepness in transmission versus voltage curve in SBE mode display, together with a high clearing point, a low viscosity, and a desired Δn value as previously mentioned. Another object of the present invention is to provide a liquid crystal diplay element having a good contrast and an improved steepness in the transmission-voltage curve in a SBE display mode.

The present invention provides a liquid crystal composition containing a first component comprising at least one compound represented by the general formula (I):

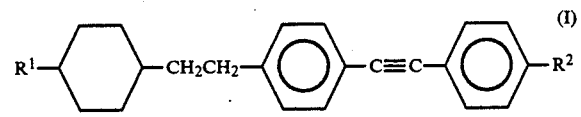

wherein $R^1$ and $R^2$ each represent an alkyl group having 1 to 8 carbon atoms,
and a second component comprising a compound represented by the general formula (II):

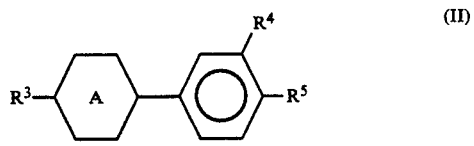

wherein $R^3$ represents an alkyl group having 1 to 8 carbon atoms, or an alkenyl group having 2 to 8 carbon atoms, $R^4$ represents H or F, $R^5$ represents a CN-group or F, and

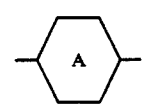

represents

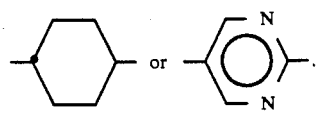

Further, the present invention provides a liquid crystal composition comprising 10 to 50 wt. % of the first component and 10 to 50 wt. % of the second component.

Further, the present invention provides a liquid crystal composition, characterized in that said liquid crystal composition comprises 10 to 50 wt. % of the first component, 10 to 50 wt. % of the second component, and as a third component at least one of compounds selected from the group consisting of compounds represented by the general formula (III):

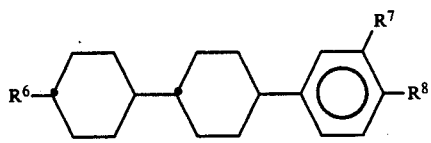
(III)

wherein $R^6$ represents an alkyl group having 1 to 8 carbon atoms, $R^7$ represents H or F, $R^8$ represents an alkyl group or an alkoxy group having 1 to 8 carbon atoms, F or a CN-group, a compound represented by the general formula (IV):

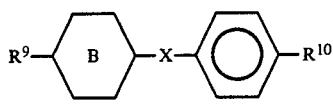
(IV)

wherein $R^9$ represents an alkyl group having 1 to 8 carbon atoms, $R^{10}$ represents F or an alkyl group or an alkoxy group having 1 to 8 carbon atoms, X is a single bond, —COO—, or —C≡C—, and

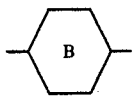

represents

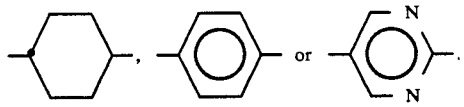

and a compound represented by the general formula (V):

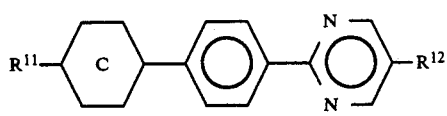
(V)

wherein $R^{11}$ represents F or an alkyl group having 1 to 8 carbon atoms, $R^{12}$ represents an alkyl group having 1 to 8 carbon atoms, and

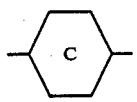

represents

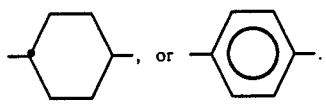

Further, the present invention provides a liquid crystal display device that uses said liquid crystal composition.

DETAILED DESCRIPTION OF THE INVENTION

The inventors have intensively studies intensively to solve the above problems, and as a result it has been found that the property values which are demanded to be improved can be improved considerably by providing a liquid crystal composition obtained by mixing a compound represented by the general formula (I) given later (Japanese Patent Application No. 075525/1987) with a compound represented by the general formula (II) that is known in the art, and if desired at least one of compounds represented by the general formulae (III), (IV) and (V) that are known in the art, leading to the completion of the present invention.

Therefore, the present invention provides a liquid crystal composition containing a first component comprising a compound represented by the general formula (I):

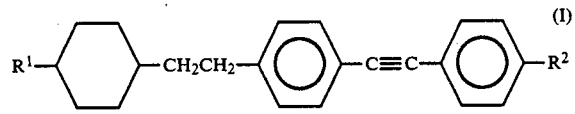
(I)

wherein $R^1$ and $R^2$ each represent an alkyl group having 1 to 8 carbon atoms,
and a second component comprising a compound represented by the general formula (II):

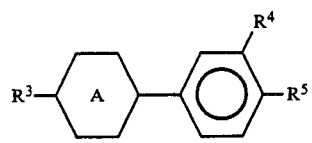
(II)

wherein $R^3$ represents an alkyl group having 1 to 8 carbon atoms, or an alkenyl group having 2 to 8 carbon atoms, $R^4$ represents H or F, $R^5$ represents a CN-group or F, and

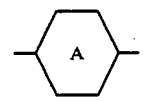

represents

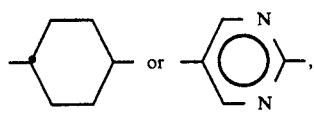

preferably the content of the first component being 10 to 50 wt. % and the content of the second component being 10 to 50 wt. %.

The compounds of the second component include, for example, 4-[trans-4-(3-alkenyl)cyclohexyl)benzonitriles, 4-(trans-4-alkylcyclohexyl)-2-fluorobenzonitriles, 4-(trans-4alkylcyclohexyl)benzonitriles, and 2-(3,4-difluorophenyl)-5alkylpyrimidines.

Further, the present invention provides a liquid crystal composition, characterized in that said liquid crystal composition comprises 10 to 50 wt. % of the first component, 10 to 50 wt. % of the second component, and as a third component at least one of compounds selected from the group consisting of a compound represented by the general formula (III):

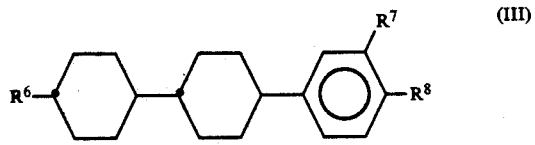
(III)

wherein $R^6$ represents an alkyl group having 1 to 8 carbon atoms, $R^7$ represents H or F, $R^8$ represents an alkyl group or an alkoxy group having 1 to 8 carbon atoms, F or a CN-group, a compound represented by the general formula (IV):

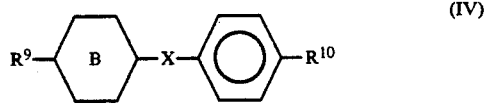
(IV)

wherein $R^9$ represents an alkyl group having 1 to 8 carbon atoms, $R^{10}$ represents F or an alkyl group or an alkoxy group having 1 to 8 carbon atoms, X is a single bond, —COO—, or —C≡C—, and

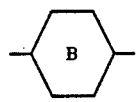

represents

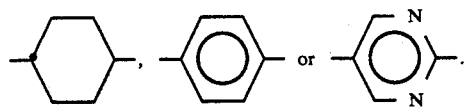

and a compound represented by the general formula (V):

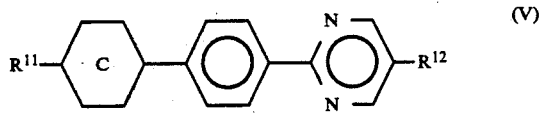
(V)

wherein $R^{11}$ represents F or an alkyl group having 1 to 8 carbon atoms, $R^{12}$ represents an alkyl group having 1 to 8 carbon atoms, and

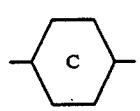

represents

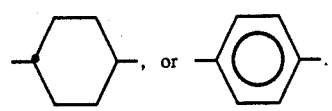

The compounds of the third component include, for example, as a compound represented by the general formula (III), 4-{trans-4-(trans-4-alkylcyclohexyl)cyclohexyl}-1,2-difluorobenzenes, 4-{trans-4-(trans-4-alkylcyclohexyl)cyclohexyl}-2-fluorobenzonitriles, 4-{trans-4-(trans-4-alkylcyclohexyl)cyclohexyl}benzonitriles, and 4-{trans-4-(trans-4-alkylcyclohexyl}alkylbenzenes, as a compound represented by the general formula (IV), 4-(trans-4-alkylcyclohexyl)alkoxybenzenes, 2-(4-alkylphenyl)-5-alkylpyrimidines, 4-alkyl-4'-alkyldiphenylacetylenes, 4-alkyl-4'-alkoxydiphenylacetylenes, 4-alkylphenyltrans-4-alkylcyclohexane carboxylates, and 4-fluorophenyl-trans-4-alkylcyclohexane carboxylates, and as a compound represented by the general formula (V), 2-{4-(trans-4-(alkylcyclohexyl)-phenyl}-5-alkylpyrimidines, and 4-(5-alkylpyrimidine-2-yl)-4'-fluorobiphenyls.

In the liquid crystal composition, of the compounds represented by the general formula (II) as the second component, a compound represented by the general formula (VI):

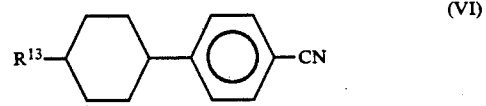
(VI)

wherein $R^{13}$ represents an alkenyl group having 2 to 8 carbon atoms, is preferable.

Of the compounds represented by the general formula (IV) as the third component, a compound represented by the general formula (VII):

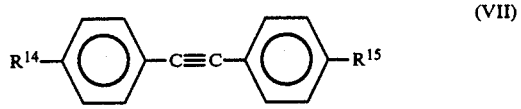
(VII)

wherein $R^{14}$ and $R^{15}$ each independently represent an alkyl group or an alkoxy group having 1 to 8 carbon atoms, is preferable.

The liquid crystal composition of the present invention can contain, in addition to the compounds represented by the general formulae (I) to (V), other nematic liquid crystals or liquid crystalline compounds for adjusting the threshold voltage, the liquid crystal temperature range, the viscosity, etc. in suitable amounts in the range which will not impair the objects of the present invention.

As suitable typical examples of such compounds can be mentioned trans-4-alkylcyclohexyl trans-4-alkylcyclohexane carboxylates, 4'-alkyl-4-cyanobiphenyls, 4-(trans-4-alkylcyclohexyl)-4'-alkylbiphenyls, and 4''-alkyl-4-cyanoterphenyls.

The present invention also provides a liquid crystal device that uses the liquid crystal composition comprising the above-mentioned first and second components, or the liquid crystal composition comprising the above-mentioned first, second and third components.

In the present composition, the content of the compound [represented by the general formula (I)] that is the first component is suitably 10 to 50 wt. %, and if the content is less than 10 wt. %, a satifactory optical anisotropy value ($\Delta n$) cannot be obtained, while if the content is more than 50 wt. %, it is not suitable because the lower limit temperature of the nematic phase rises to make narrow the working temperature range on the lower temperature side too narrow.

The content of the second component represented by the general formula (II) is suitably 10 to 50 wt. %, and if the content is less than 10 wt. %, the lowering of the threshold voltage is not enough. If the content is more than 50 wt. %, it is not preferable because the transparent point of the obtained liquid crystal composition is lowered, therefore the temperature dependency of the optical anisotropy value ($\Delta n$) increases, and an unfavorable effect that causes the tint of the display to change occurs.

As will become apparent from examples given later, the present invention provides a nematic liquid crystal composition having an improved steepness in transmission versus voltage curve in a SBE mode display, together with a high clearing point, a low viscosity, and a desired $\Delta n$ value as previously mentioned. And the present invention provides a liquid crystal display element having a good contrast and an improved steepness in transmission-voltage curve in a SBE display mode.

The compounds represented by the general formula (1) can be produced, for example, by the following process.

In the formulae below, $R^1$, $R^2$ and X have the same meanings as defined above.

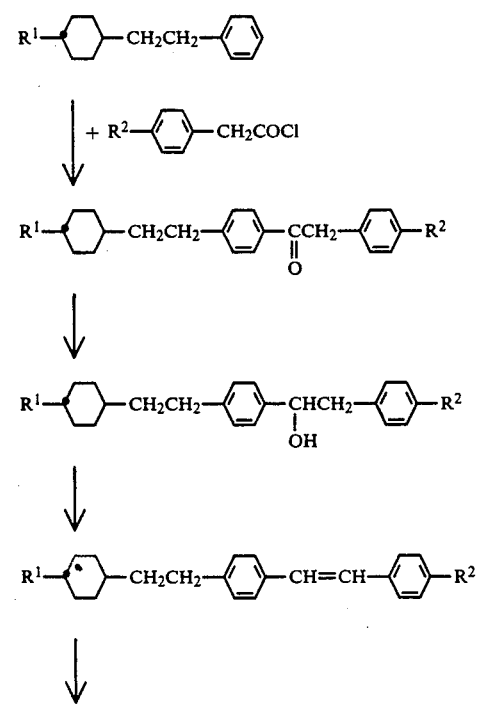

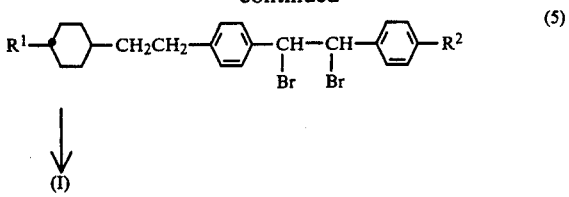

First, a substituted benzene represented by the formula (1) is reacted with a 4-substituted phenylacetyl chloride and anhydrous aluminum chloride in carbon disulfide to produce the ketone derivative of the formula (2). This ketone derivative of the formula (2) is reacted with a reducing agent such as lithium aluminum hydride in an anhydrous solvent such as ether or tetrahydrofuran to produce the compound of the formula (3). Then, this alcohol derivative is subjected to a dehydration reaction at reflux temperature under normal pressures in an inactive organic solvent in the presence of the below-mentioned catalyst to produce the ethylene derivative of the formula (4). As the inactive organic solvent, for example, benzene, toluene, chloroform, carbon tetrachloride, and methylene chloride are suitable, and as the catalyst, use can be made of a Lewis acid such as aluminum chloride, tin tetrachloride, or titanium tetrachloride, and a mineral acid such as sulfuric acid, and phosphoric acid, or toluene sulfonic acid. Then, bromine is added to the ethylene derivative of the formula (4) in a solvent such as methylene chloride, ethylene chloride, or carbon tetrachloride to produce the compound of the formula (5). The compound of the formula (5) is reacted with potassium t-butoxide in a tetrahyrdofuran solvent followed by a series of refining processes including extraction, washing with water, and recrystallization to produce the intended compound of the formula (I). The reaction in each step is known, but as a whole this process is a novel synthesis process.

The substituted benzene of the formula (1) used as a starting raw material can be obtained by applying known reactions to a readily available raw material. That is, the compound of the formula (1) can be obtained by the Friedel-Crafts reaction of a trans-4-alkylcyclohexylacetyl chloride with benzene or by the coupling of a trans-4-alkylcyclohexylacetyl chloride with bis(3-fluorophenyl) cadmium to obtain a ketone derivative that will then be reduced.

The effect which results from the present invention is that properties required in the SBE mode, particularly the steepness in the voltage-transmission characteristics, having a high transparent temperature, a low viscosity, and a controllable optical anisotropy $\Delta n$ are well balanced.

Desirably the value of the steepness $\alpha$ defined by the following formula (1) is nearer to 1 as far as possible in the case of a liquid crystal display device of the multiplex driving mode, and in the present invention, a smaller value of $\alpha$ has been attained.

It is considered that to this, compounds of the formulae (I), (II) and (III) contribute considerably, and among others, compounds of the formulae (I) and (II) contribute considerably.

This is exhibited clearly by comparison of the following examples and comparative examples. By mixing compounds of the formulae (I), (II) and (III) as major components in suitable proportions. In addition to $\alpha$, the viscosity can also be improved.

The liquid crystal composition of the present invention has the properties mentioned above, and also exhibits a high value of $N_{max}$ that indicates high multiplex properties. Therefore, by using the above composition, multiplex drive with 1/100 duty or over by the SBE mode becomes possible.

Also since the above composition has a high transparent point and a low viscosity, it can of course be used in the 90-degree twist TN mode wherein the steepness is not particularly required.

EXAMPLES

The present invention will be described in detail with reference to the examples below, but the present invention is not limited to the examples.

For the purpose of illustrating the effects of the present liquid crystal composition and the display device that uses the same, expressions for indicating the property values of the composition will be described.

In the present invention, the steepness of the voltage-transmission characteristics is defined by the value of $\alpha$ given by the following formula:

$$\alpha = V_{80}/V_{10} \tag{1}$$

wherein $V_{10}$ and $V_{80}$ represent such voltages that the transmission of light in the direction of the optical axis normal to the display surface becomes 10% and 80% respectively, and $V_{10}$ and $V_{80}$ are designated threshold voltage and ON voltage respectively.

Thus, it is indicated that the nearer the parameter $\alpha$ is to 1, the steeper the voltage luminance property.

The parameter $N_{max}$ indicating the multiplex number is defined by the following equation using this $\alpha$:

$$N_{max} = \left( \frac{\alpha^2 + 1}{\alpha^2 - 1} \right)^2 \tag{2}$$

Thus the larger the $N_{max}$, the more possible the high multiplex.

In the following examples and comparative examples, the compositions are given in terms of wt. %.

EXAMPLE 1

As a first component, a mixture was used that was made up of the following five compounds in the indicated proportions:

| | |
|---|---|
| 4-{2-(trans-4-ethylcyclohexyl)ethyl}-4'-ethyldiphenylacetylene | 10% |
| 4-{2-(trans-4-ethylcyclohexyl)ethyl}-4'-propyldiphenylacetylene | 10% |
| 4-{2-(trans-4-propylcyclohexyl)ethyl}-4'-ethyldiphenylacetylene | 10% |
| 4-{2-(trans-4-propylcyclohexyl)ethyl}-4'-propyldiphenylacetylene | 10% |
| 4-{2-(trans-4-propylcyclohexyl)ethyl}-4'-butyldiphenylacetylene | 10% |

As a second component, a mixture was used that was made up of the following two compounds:

| | |
|---|---|
| 4-{trans-4-(3-butenyl)cyclohexyl}benzonitrile | 10% |
| 4-{trans-4-(3-pentenyl)cyclohexyl}benzonitrile | 10% |

As a third component, the following compound was used:

| | |
|---|---|
| 4-(trans-4-propylcyclohexyl)ethoxybenzene | 30% |

A liquid crystal composition comprising the above eight compounds was prepared. The liquid crystal composition had a transparent point of 100.0° C., an optical anisotropy value of 0.173, and a viscosity at 20° C. of 16 cp.

A chiral substance (S-811 manufactured by E. Merck) was added to the composition, and the resulting composition was sealed in a cell having rubbed polyimide oriented films on opposed transparent plane electrodes, a small tilt angle (<3 degrees), and a twist angle of 180 degrees under the following conditions:

$$d \times \Delta n = 0.9 \ \mu m, \text{ and } d/P = 0.5$$

wherein P represents a helical pitch inherent to the chiral nematic liquid crystal, and d represents the cell thickness, which is the distance between the electrodes.

The threshold voltage at 25° C. was 3.5620 V, the parameter $\alpha$ that indicated the steepness was 1.079, and the parameter $N_{max}$ that indicated the multiplex number was 173.

EXAMPLE 2

As a first component, the following compound was used:

| | |
|---|---|
| 4-{2-(trans-4-propylcyclohexyl)ethyl}-4'-butyldiphenylacetylene | 10% |

As a second component, the following compound was used:

| | |
|---|---|
| 4-(trans-4-propylcyclohexyl)benzonitrile | 30% |

As a third component, the following five compounds were used:

| | |
|---|---|
| 4-ethoxyphenyltrans-4-propylcyclohexane carboxylate | 10% |
| 4-ethoxyphenyltrans-4-butylcyclohexane carboxylate | 10% |
| 4-{trans-4-(trans-4-ethylcyclohexyl)cyclohexyl}-1,2-difluorobenzene | 10% |
| 4-{trans-4-(trans-4-propylcyclohexyl)cyclohexyl}-1,2-difluorobenzene | 10% |
| 4-{trans-4-(trans-4-pentylcyclohexyl)cyclohexyl}-1,2-difluorobenzene | 10% |

The following compound was used as another compound:

| | |
|---|---|
| 4'-ethyl-4-cyanobiphenyl | 10% |

A liquid crystal composition made up of the above compounds was prepared, and its properties were measured in the same way as in Example 1. Along with the results of Example 1, the results are shown in Table 1.

EXAMPLE 3

As a first component, the following four compounds were used:

| | |
|---|---|
| 4-{2-(trans-4-ethylcyclohexyl)ethyl}-4'-propyldiphenylace- | 10% |

-continued

| | |
|---|---|
| tylene | |
| 4-{2-(trans-4-propylcyclohexyl)ethyl}-4'-ethyldiphenylacetylene | 10% |
| 4-{2-(trans-4-propylcyclohexyl)ethyl}-4'-propyldiphenylacetylene | 10% |
| 4-{2-(trans-4-propylcyclohexyl)ethyl}-4'-butyldiphenylacetylene | 10% |

As a second component, the following two compounds were used:

| | |
|---|---|
| 4-{trans-4-(3-butenyl)cyclohexyl}benzonitrile | 15% |
| 4-{trans-4-(3-pentenyl)cyclohexyl}benzonitrile | 15% |

As a third component, the following six compounds were used:

| | |
|---|---|
| 4-ethyl-4'-methyldiphenylacetylene | 4% |
| 4-ethyl-4'-hexyldiphenylacetylene | 8% |
| 4-methyl-4'-hexyldiphenylacetylene | 4% |
| 4,4'-dibutyldiphenylacetylene | 4% |
| 4-{trans-4-(trans-4-ethylcyclohexyl)cyclohexyl}benzonitrile | 5% |
| 4-{trans-4-(trans-4-propylcyclohexyl)cyclohexyl}-benzonitrile | 5% |

A liquid crystal composition containing the above compounds was prepared, and its properties were measured in the same manner as in Example 1. The results are shown in Table 1.

EXAMPLE 4

As a first component, the following four compounds were used:

| | |
|---|---|
| 4-{2-(trans-4-ethylcyclohexyl)ethyl}-4'-ethyldiphenyl-acetylene | 10% |
| 4-{2-(trans-4-propylcyclohexyl)ethyl}-4'-ethyldiphenyl-acetylene | 10% |
| 4-{2-(trans-4-propylcyclohexyl)ethyl}-4'-propyldiphenyl-acetylene | 10% |
| 4-{2-(trans-4-propylcyclohexyl)ethyl}-4'-butyldiphenyl-acetylene | 10% |

As a second component, the following compound was used:

| | |
|---|---|
| 4-(trans-4-propylcyclohexyl)-2-fluorobenzonitrile | 10% |

As the third component, the following six compounds were used:

| | |
|---|---|
| 4-[trans-4-(trans-4-propylcyclohexyl)cyclohexyl]-2-fluorobenzonitrile | 10% |
| 2-{4-(trans-4-propylcyclohexyl)phenyl}-5-ethylpyrimidine | 10% |
| 4-(trans-4-propylcyclohexyl)ethoxybenzene | 10% |
| 2-(4-ethylphenyl)-5-ethylpyrimidine | 7% |
| 2-(4-ethylphenyl)-5-propylpyrimidine | 7% |
| 2-(4-ethylphenyl)-5-butylpyrimidine | 6% |

A liquid crystal composition consisting of a mixture made up of these eleven compounds were prepared, and its property values were measured. The results are shown in Table 1.

EXAMPLE 5

As a first component, the following two compounds were used:

| | |
|---|---|
| 4-{2-(trans-4-propylcyclohexyl)ethyl}-4'-propyldiphenyl-acetylene | 10% |
| 4-{2-(trans-4-propylcyclohexyl)ethyl}-4'-butyldiphenyl-acetylene | 10% |

As a second component, the following two compounds were used:

| | |
|---|---|
| 4-(trans-4-ethylcyclohexyl)-2-fluorobenzonitrile | 10% |
| 4-(trans-4-propylcyclohexyl)-2-fluorobenzonitrile | 10% |

As a third component, the following four compounds were used:

| | |
|---|---|
| 4-fluorophenyl-trans-4-pentylcyclohexane carboxylate | 10% |
| 4-fluorophenyl-trans-4-heptylcyclohexane carboxylate | 10% |
| 4-ethoxyphenyl-trans-4-propylcyclohexane carboxylate | 10% |
| 4-{trans-4-(trans-4-propylcyclohexyl)cyclohexyl}-propylbenzene | 20% |

As other compounds, the following two compounds were used:

| | |
|---|---|
| 4-(trans-4-pentylcyclohexyl)-4'-ethylbiphenyl | 5% |
| 4''-pentyl-4-cyanoterphenyl | 5% |

A liquid crystal composition consisting of a mixture made up of the above ten compounds was prepared, and its property values were measured in the same way as in Example 1. The results are shown in Table 1.

EXAMPLE 6

As a first component, the following five compounds were used:

| | |
|---|---|
| 4-{2-(trans-4-ethylcyclohexyl)ethyl}-4'-ethyldiphenyl-acetylene | 8% |
| 4-{2-(trans-4-ethylcyclohexyl)ethyl}-4'-propyldiphenyl-acetylene | 8% |
| 4-{2-(trans-4-propylcyclohexyl)ethyl}-4'-ethyldiphenyl-acetylene | 8% |
| 4-{2-(trans-4-propylcyclohexyl)ethyl}-4'-propyldiphenyl-acetylene | 8% |
| 4-{2-(trans-4-propylcyclohexyl)ethyl}-4'-butyldiphenyl-acetylene | 8% |

As a second component, the following three compounds were used:

| | |
|---|---|
| 2-(3,4-difluorophenyl)-5-propylpyrimidine | 10% |
| 4-{trans-4-(3-butenyl)cyclohexyl}benzonitrile | 10% |
| 4-{trans-4-(3-pentenyl)cyclohexyl}benzonitrile | 10% |

As a third component, the following four compounds were used:

| | |
|---|---|
| 4-ethyl-4'-methyldiphenylacetylene | 6% |
| 4-ethyl-4'-hexyldiphenylacetylene | 12% |
| 4-methyl-4'-hexyldiphenylacetylene | 6% |

-continued

| 4-4'-dibutyldiphenylacetylene | 6% |

A liquid crystal composition containing the above twelve compounds was prepared, and its property values were measured in the same way as in Example 1. The results are shown in Table 1.

EXAMPLE 7

As a first component, the following four compounds were used:

| 4-{2-(trans-4-ethylcyclohexyl)ethyl}-4'-ethyldiphenylacetylene | 9% |
| 4-{2-(trans-4-ethylcyclohexyl)ethyl}-4'-propyldiphenylacetylene | 9% |
| 4-{2-(trans-4-propylcyclohexyl)ethyl}-4'-ethyldiphenylacetylene | 9% |
| 4-{2-(trans-4-propylcyclohexyl)ethyl}-4'-propyldiphenylacetylene | 8% |

As a second component, the following compound was used:

| 2-(3,4-difluorophenyl)-5-propylpyrimidine | 12% |

As a third component, the following nine compounds were used:

| 4-ethyl-4'-methyldiphenylacetylene | 4% |
| 4-ethyl-4'-hexyldiphenylacetylene | 8% |
| 4-methyl-4'-hexyldiphenylacetylene | 5% |
| 4-4'-dibutyldiphenylacetylene | 5% |
| 4-(5-ethylpyrimidine-2-yl)-4'-fluorobiphenyl | 7% |
| 4-(5-propylpyrimidine-2-yl)-4'-fluorobiphenyl | 7% |
| 4-(5-butylpyrimidine-2-yl)-4'-fluorobiphenyl | 7% |
| 2-(4-ethylphenyl)-5-ethylpyrimidine | 5% |
| 2-(4-ethylphenyl)-5-propylpyrimidine | 5% |

A liquid crystal composition containing the above fourteen compounds were prepared, and its properties were measured in the same way as in Example 1. The results are shown in Table 1.

EXAMPLE 8

As a first component, the following five compounds were used:

| 4-{2-(trans-4-ethylcyclohexyl)ethyl}-4'-ethyldiphenylacetylene | 10% |
| 4-{2-(trans-4-ethylcyclohexyl)ethyl}-4'-propyldiphenylacetylene | 10% |
| 4-{2-(trans-4-propylcyclohexyl)ethyl}-4'-ethyldiphenylacetylene | 10% |
| 4-{2-(trans-4-propylcyclohexyl)ethyl}-4'-propyldiphenylacetylene | 10% |
| 4-{2-(trans-4-propylcyclohexyl)ethyl}-4'-butyldiphenylacetylene | 10% |

As a second component, the following two compounds were used:

| 4-(trans-4-ethylcyclohexyl)benzonitrile | 10% |
| 4-(trans-4-propylcyclohexyl)benzonitrile | 20% |

As other compounds, the following two compounds were used:

| trans-4-propylcyclohexyltrans-4-propylcyclohexane carboxylate | 10% |
| trans-4-propylcyclohexyltrans-4-butylcyclohexane carboxylate | 10% |

A liquid crystal composition made up of a mixture of the above nine compounds was prepared, and its properties were measured in the same way as in Example 1. The results are shown in Table 1.

EXAMPLE 9

As a first component, the following five compounds were used:

| 4-{2-(trans-4-ethylcyclohexyl)ethyl}-4'-ethyldiphenylacetylene | 10% |
| 4-{2-(trans-4-ethylcyclohexyl)ethyl}-4'-propyldiphenylacetylene | 10% |
| 4-{2-(trans-4-propylcyclohexyl)ethyl}-4'-ethyldiphenylacetylene | 10% |
| 4-{2-(trans-4-propylcyclohexyl)ethyl}-4'-propyldiphenylacetylene | 10% |
| 4-{2-(trans-4-propylcyclohexyl)ethyl}-4'-butyldiphenylacetylene | 10% |

As a second component, the following four compounds were used:

| 4-(trans-4-ethylcyclohexyl)benzonitrile | 10% |
| 4-(trans-4-propylcyclohexyl)benzonitrile | 20% |
| 4-{trans-4-(3-butenyl)cyclohexyl}benzonitrile | 10% |
| 4-{trans-4-(3-pentenyl)cyclohexyl}benzonitrile | 10% |

EXAMPLE 10

As a first component, the following four compounds were used:

| 4-{2-(trans-4-ethylcyclohexyl)ethyl}-4'-propyldiphenylacetylene | 10% |
| 4-{2-(trans-4-propylcyclohexyl)ethyl}-4'-ethyldiphenylacetylene | 10% |
| 4-{2-(trans-4-propylcyclohexyl)ethyl}-4'-propyldiphenylacetylene | 10% |
| 4-{2-(trans-4-propylcyclohexyl)ethyl}-4'-butyldiphenylacetylene | 10% |

As a second component, the following two compounds were used:

| 4-{trans-4-(3-butenyl)cyclohexyl}benzonitrile | 15% |
| 4-{trans-4-(3-pentenyl)cyclohexyl}benzonitrile | 15% |

As the third component, the following six compounds were used:

| 4-propyl-4'-ethoxydiphenylacetylene | 4% |
| 4-ethyl-4'-hexyldiphenylacetylene | 8% |
| 4-methyl-4'-hexyldiphenylacetylene | 4% |
| 4,4'-dibutyldiphenylacetylene | 4% |
| 4-{trans-4-(trans-4-ethylcyclohexyl)cyclohexyl}benzonitrile | 5% |
| 4-{trans-4-(trans-4-propylcyclohexyl)cyclohexyl}benzonitrile | 5% |

A liquid crystal composition containing the above compounds was prepared, and its properties were measured in the same way as in Example 1. The results are shown in Table 1.

COMPARATIVE EXAMPLE

For comparison, a generally used known liquid crystal composition containing the following eight compounds was prepared:

| | |
|---|---|
| 4'-ethyl-4-cyanobiphenyl | 15% |
| 4'-butyl-4-cyanobiphenyl | 10% |
| 4-butoxyphenyltrans-4-butylcyclohexane carboxylate | 16% |
| 4-ethoxyphenyltrans-4-butylcyclohexane carboxylate | 12% |
| 4-methoxyphenyltrans-4-pentylcyclohexane carboxylate | 12% |
| 4-ethoxyphenyltrans-4-propylcyclohexane carboxylate | 10% |
| 4-ethoxyphenyltrans-4-pentylcyclohexane carboxylate | 10% |
| 4'-(trans-4-pentylcyclohexyl)-4-cyanobiphenyl | 15% |

The property values were measured in the same way as in Example 1. The results are shown in Table 1.

TABLE 1

| Property | Example No. | | | | | | | | | | * 1 |
|---|---|---|---|---|---|---|---|---|---|---|---|
| | 1 | 2 | 3 | 4 | 5 | 6 | 7 | 8 | 9 | 10 | |
| Transparent point [°C.] | 100.0 | 74.0 | 92.3 | 96.7 | 90.6 | 72.3 | 75.3 | 92.7 | 104.5 | 109.1 | 78.8 |
| Optical anisotropy [n] | 0.173 | 0.121 | 0.202 | 0.182 | 0.133 | 0.198 | 0.218 | 0.161 | 0.187 | 0.197 | 0.142 |
| Viscosity (20 C.) [cp] | 16.0 | 17.7 | 26.4 | 22.8 | 22.5 | 21.1 | 21.9 | 18.9 | 19.9 | 29.0 | 33.9 |
| Threshold voltage $V_{10}$ (25° C.) [V] | 3.520 | 1.780 | 2.780 | 2.410 | 2.380 | 2.260 | 2.240 | 2.540 | 2.330 | 2.800 | 2.030 |
| (= V80/V10) (25° C.) | 1.079 | 1.086 | 1.082 | 1.092 | 1.088 | 1.086 | 1.096 | 1.078 | 1.080 | 1.082 | 1.120 |
| $N_{max}$ (25° C.) | 173 | 147 | 161 | 129 | 141 | 147 | 119 | 177 | 169 | 161 | 79 |

*Comparative Example

What is claimed is:

1. A super-twisted birefringence effect mode liquid crystal display device comprising a first component including at least one compound represented by the general formula (I):

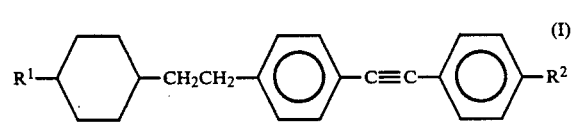

wherein $R^1$ and $R^2$ each represent an alkyl group having 1 to 8 carbon atoms, and a second compartment including at least one compound represented by the general formula (II):

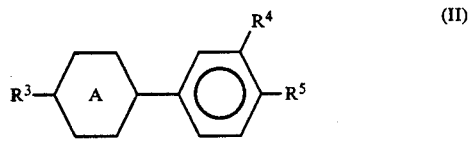

wherein $R^3$ represents an alkyl group having 1 to 8 carbon atoms, or an alkenyl group having 2 to 8 carbon atoms, $R^4$ represents H or F, $R^5$ represents a CN-group or F, and

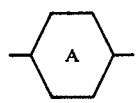

represents

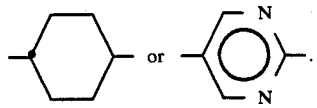

2. A super-twisted birefringence effect mode liquid crystal display device as claimed in claim 1, comprising 10 to 50 wt. % of the first component and 10 to 50 wt. % of the second component.

3. A super-twisted birefringence effect mode display liquid crystal composition comprising 10 to 50% by weight of a first component including at least one compound represented by the general formula (I):

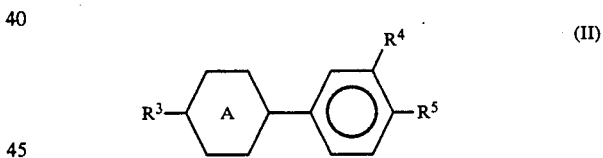

wherein $R^1$ and $R^2$ each represent an alkyl group having 1 to 8 carbon atoms, and 10 to 50% by weight of a second component including at least one compound represented by the general formula (II):

wherein $R^3$ represents an alkyl group having 1 to 8 carbon atoms, or an alkenyl group having 2 to 8 carbon atoms, $R^4$ represents H or F, $R^5$ represents a CN-group or F, and

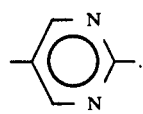

represents

4. A liquid crystal composition as claimed in claim 3, which comprises 10 to 50 wt. % of the first component, 10 to 50 wt. % of the second component, and as a third component at least one compound selected from the group consisting of compounds represented by the general formula (III):

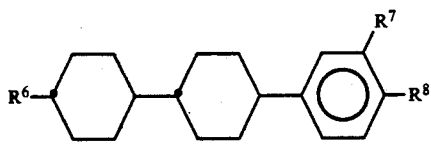
(III)

wherein $R^6$ represents an alkyl group having 1 to 8 carbon atoms, $R^7$ represents H or F, $R^8$ represents an alkyl group or an alkoxy group having 1 to 8 carbon atoms, F or a CN-group, a compound represented by the general formula (IV):

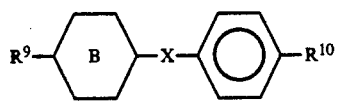
(IV)

wherein $R^9$ represents an alkyl group having 1 to 8 carbon atoms, $R^{10}$ represents F or an alkyl group or an alkoxy group having 1 to 8 carbon atoms, X is a single bond, —COO—, or —C≡C—, and

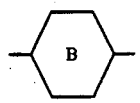

represents

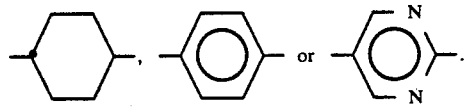

and a compound represented by the general formula (V):

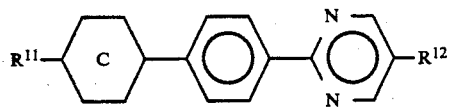
(V)

wherein $R^{11}$ represents F or an alkyl group having 1 to 8 carbon atoms, $R^{12}$ represents an alkyl group having 1 to 8 carbon atoms, and

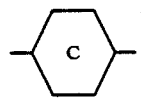

represents

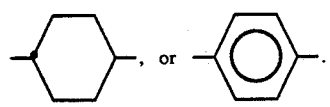

5. A liquid crystal composition as claimed in claim 4, which comprises compound(s) represented by the following general formula (VII) as the third component:

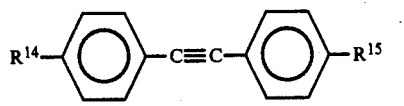
(VII)

wherein $R^{14}$, and $R^{15}$ each independently represent an alkyl group or an alkoxy group having 1 to 8 carbon atoms.

6. A super-twisted birefringence effect mode liquid crystal display device comprising 10 to 50% by weight of a first component including at least one compound represented by the general formula (I):

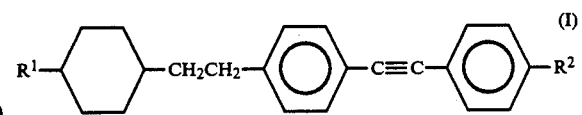
(I)

wherein $R^1$ and $R^2$ each represent an alkyl group having 1 to 8 carbon atoms, 10 to 50% by weight of a second component including at least one compound represented by the general formula (II):

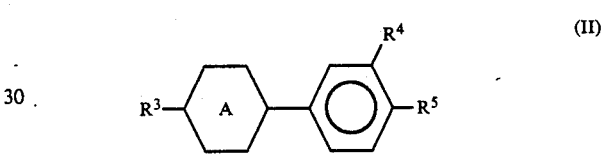
(II)

wherein $R^3$ represents an alkyl group having 1 to 8 carbon atoms, or an alkenyl group having 2 to 8 carbon atoms, $R^4$ represents H or F, $R^5$ represents a CN-group or F, and

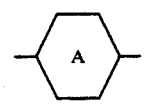

represents

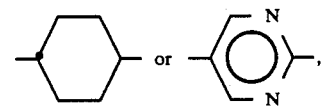

and as a third component at least one of compounds selected from the group consisting of compounds represented by the general formula (III):

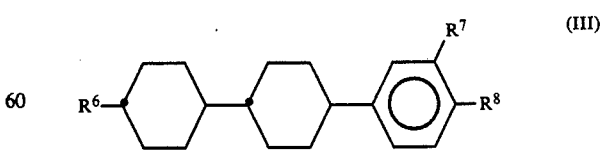
(III)

wherein $R^6$ represents an alkyl group having 1 to 8 carbon atoms, $R^7$ represents H or F, $R^8$ represents an alkyl group or an alkoxy group having 1 to 8 carbon atoms, F or a CN-group, a compound represented by the general formula (IV):

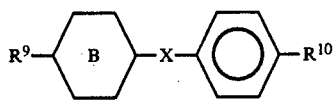 (IV)

wherein $R^9$ represents an alkyl group having 1 to 8 carbon atoms, $R^{10}$ represents F or an alkyl group or an alkoxy group having 1 to 8 carbon atoms, X is a single bond, —COO—, or —C≡C—, and

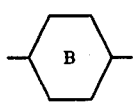

represents

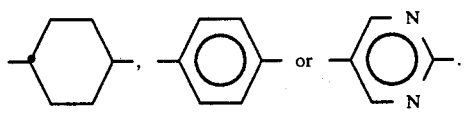

a compound represented by the general formula (V):

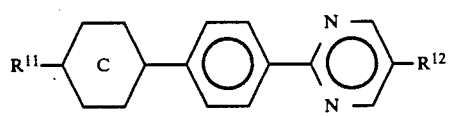 (V)

wherein $R^{11}$ represents F or an alkyl group having 1 to 8 carbon atoms, $R^{12}$ represents an alkyl group having 1 to 8 carbon atoms, and

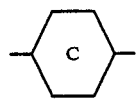

represents

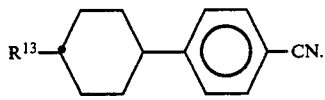

7. A super-twisted birefringence effect mode liquid crystal display device as claimed in claim 6, which comprises compound(s) represented by the following general formula (VI) as the second component:

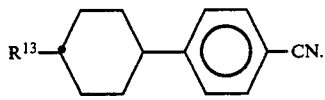 (VI)

wherein $R^{13}$ represents an alkenyl group having 2 to 8 carbon atoms.

8. A super-twisted birefringence effect mode liquid crystal display device as claimed in claim 6, which comprises compound(s) represented by the following general formula (VII) as the third component:

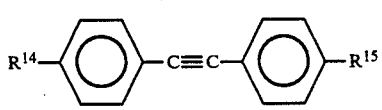 (VII)

wherein $R^{14}$, and $R^{15}$ each independently represent an alkyl group or an alkoxy group having 1 to 8 carbon atoms.

* * * * *